United States Patent [19]

Furukawa

[11] 4,213,683
[45] Jul. 22, 1980

[54] ELECTRONIC SHUTTER DRIVING DEVICE FOR CAMERA

[75] Inventor: Masamichi Furukawa, Yokohama, Japan

[73] Assignee: Ricoh Company, Ltd., Tokyo, Japan

[21] Appl. No.: 923,903

[22] Filed: Jul. 12, 1978

[30] Foreign Application Priority Data

Jul. 18, 1977 [JP] Japan .............................. 52/85752
Aug. 24, 1977 [JP] Japan ............................. 52/101427

[51] Int. Cl.$^2$ ......................... G03B 7/08; G06G 7/24
[52] U.S. Cl. ....................................... 354/24; 354/51; 328/145; 307/229
[58] Field of Search ................... 354/24, 51; 356/223; 250/214 L; 307/229, 230; 328/144, 145

[56] References Cited
U.S. PATENT DOCUMENTS
4,057,809  11/1977  Nakamoto et al. ................. 354/24 X

FOREIGN PATENT DOCUMENTS
2163188  7/1973  Fed. Rep. of Germany ............. 354/24

Primary Examiner—L. T. Hix
Assistant Examiner—William B. Perkey
Attorney, Agent, or Firm—Burgess, Ryan and Wayne

[57] ABSTRACT

An electronic shutter driving device has a logarithmic expansion circuit which includes no semiconductor element such as a transistor and a field-effect transistor and comprises an operational amplifier, a series of resistors connected to an inverting input terminal of the operational amplifier, a plurality of capacitors interconnected between the inverting input terminal of said operational amplifier and the junctions, respectively, between the resistors and an integrating capacitor interconnected between the inverting input terminal and output terminal of the operational amplifier, a source voltage being applied to the output terminal or a reference voltage input terminal of said operational amplifier.

4 Claims, 8 Drawing Figures

ELECTRONIC SHUTTER DRIVING DEVICE FOR CAMERA

BACKGROUND OF THE INVENTION

The present invention relates to an electronic shutter driving device for a camera.

In general, the electronic shutter driving devices include a logarithmic compression circuit and a logarithmic expansion circuit. The logarithmic expansion circuit generally consists of transistors or field-effect transistors. The operation of semiconductor elements is greatly influenced by the temperature variation and their temperature coefficients vary widely depending on temperatures.

The conventional logarithmic expansion circuit including operational amplifier generally requires two power or voltage sources. There has been also a circuit in which the noninverting input terminal of an operational amplifier is not grounded or not impressed with a source voltage, but is connected to a center tap of a voltage divider. However the input or output voltage range is limited by a voltage at the center tap, so that the input signal processing range is reduced and consequently the satisfactorily precise control of the shutter driving circuit cannot be attained. Therefore one-power-source type logarithmic expansion circuit cannot be employed in the camera which requires precise operation. The logarithmic expansion circuit operable with two power sources has a defect that the shutter driving device becomes heavy in weight.

SUMMARY OF THE INVENTION

According to the present invention, the portion of the logarithmic expansion circuit which determines its logarithmic characteristics includes no semiconductor element such as a transistor or a field-effect transistor and comprises an operational amplifier, a series of resistors connected to the inverting input terminal of the operational amplifier, a plurality of capacitors interconnected between the inverting input terminal of the operational amplifier and the junctions, respectively, between the resistors, an integrating capacitor interconnected between the inverting input terminal and output terminal of the operational amplifier, a source voltage being applied to the output terminal or reference voltage input terminal of the operational amplifier, and the reference voltage input terminal being grounded or connected to a reference voltage source the voltage of which is substantially equal to the ground potential.

Therefore the expansion circuit in accordance with the present invention is free from the adverse effects due to temperature variation, and the input signal may be processed within the whole range of the source voltage.

BRIEF DESCRIPTION OF THE DRAWINGS

Same reference numerals are used to designate similar parts throughout the figures.

DESCRIPTION OF THE PREFERRED EMBODIMENTS

Figure 1:
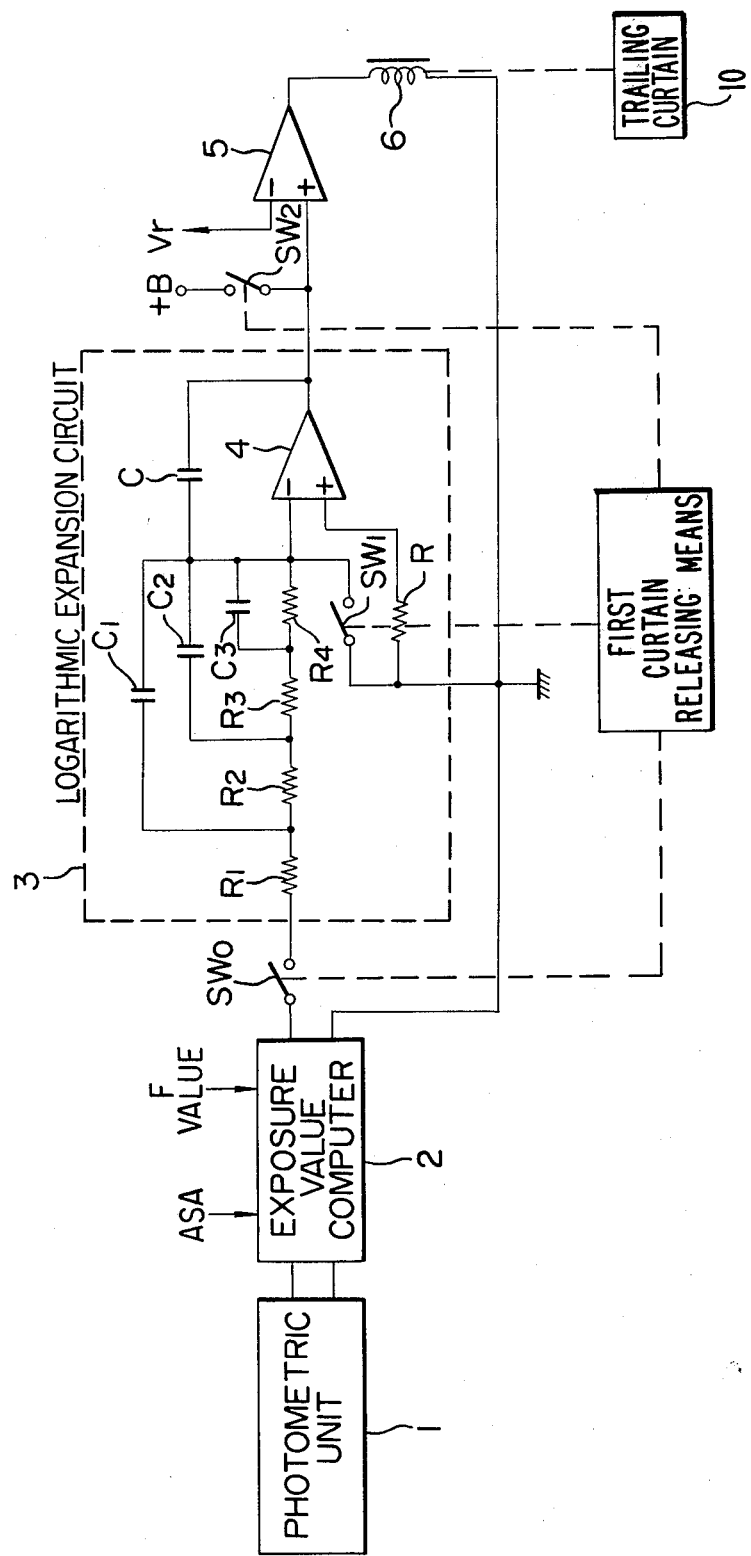
FIG. 1 is a circuit diagram of a first embodiment of the present invention.

Referring to FIG. 1, a photometric unit 1 includes a photoelectric transducer and generates an output voltage signal which has been logarithmically compressed; that is, the brightness of a subject. An exposure value computer 2 accepts not only the output signal from the photometric unit 1 but also a signal representative of ASA number and a signal representative of a selected aperture and generates an output voltage signal representative of a shutter speed giving an optimum exposure. The output voltage signal from the exposure value computer 2 is applied to a logarithmic expansion circuit 3.

The expansion circuit 3 includes an operational amplifier 4 having an inverting input terminal (−) connected to a series of resistors $R_1$, $R_2$, $R_3$ and $R_4$. A capacitor $C_1$ is connected between the junction between the resistors $R_1$ and $R_2$ and the inverting input terminal of the operational amplifier 4. In like manner, a capacitor $C_2$ between the junction between the resistors $R_2$ and $R_3$ and the inverting input terminal; and a capacitor $C_3$, between the junction between the resistors $R_3$ and $R_4$ and the terminal (−) of the operational amplifier 4. An integrating capacitor C is connected between the inverting input terminal (−) and output terminal of the operational amplifier 4. A first switch $SW_1$ is connected between the inverting input terminal (−) of the operational amplifier 4 and ground. A noninverting input terminal (+) of the amplifier 4 is grounded through a resistor R. The output terminal of the amplifier 4 is connected to a power source +B through a second switch $SW_2$ and to one input terminal (+) of a comparator 5.

The other input terminal (−) of the comparator 5 is grounded through an electromagnet 6 which holds a trailing curtain 10 of a shutter and is connected to a grounding terminal of the exposure value computer 2. The output terminal of the computer 2 is connected to the logarithmic expansion circuit 3 through a shutter actuating switch $SW_0$.

When the values of the resistors $R_1$-$R_4$ and capacitors $C_1$-$C_3$ are suitably selected, the output voltage v from the logarithmic expansion circuit 3 may satisfy the following relation.

$$v = \log_2 t,$$

where t is time.

Figure 2:
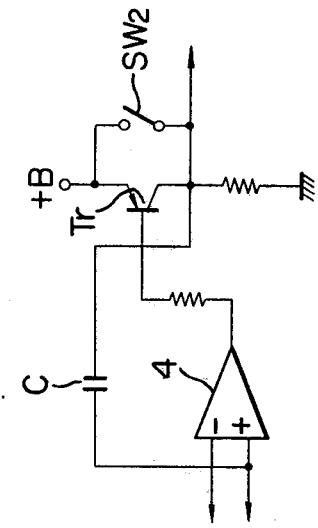
FIG. 2 shows the output voltage-time characteristic curves of a logarithmic expansion circuit in accordance with the present invention.

That is, as shown in FIG. 2, in response to the output voltages $E_0$, $E_1$ and $E_2$ from the exposure value computer 2, the logarithmic expansion circuit 3 logarithmically expands exposure times $t_0$, $t_1$ and $t_2$.

Prior to the travel of the first curtain of the shutter, the switch $SW_0$ remains OFF while the first and second switches $SW_1$ and $SW_2$ remain ON, so that the integrating capacitor C is charged to a voltage equal to the power source +B. When a reference $V_r$ is lower than the power source voltage +B, the comparator output energizes the electromagnet 6 so as to hold the second or trailing curtain. When a shutter release is actuated, the switch $SW_0$ is closed while the first and second switches $SW_1$ and $SW_2$ are opened so that the integrating capacitor C and the operational amplifier 4 start integration. When the output voltage from the logarithmic expansion circuit 3 drops below the reference voltage $V_r$, no output is derived from the comparator 5, so that the electromagnet 6 is de-energized whereby the second curtain is released following the first curtain. Thus an optimum exposure time or shutter speed is obtained.

Figure 5:
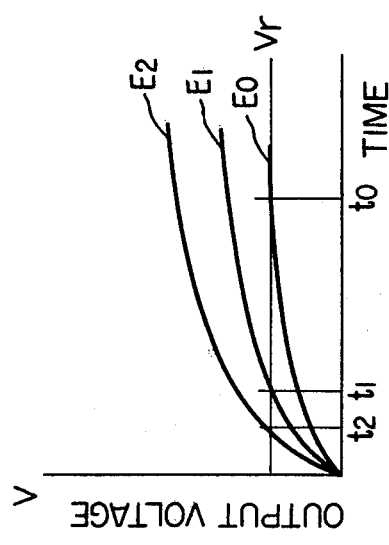
FIGS. 3-7 are circuit diagrams of second to sixth embodiments, respectively, of the present invention.
Figure 4:
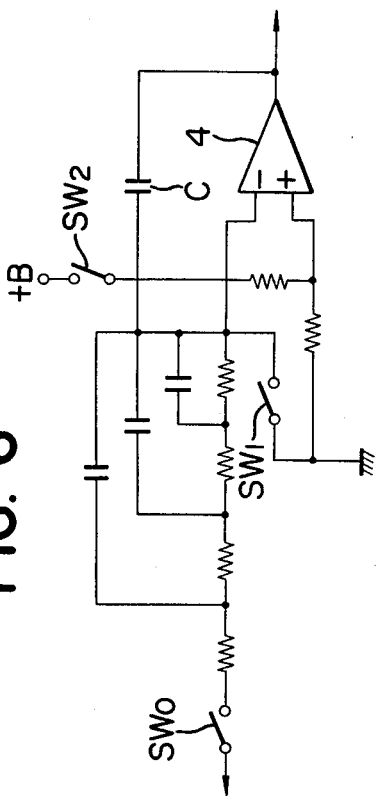
Figure 6:
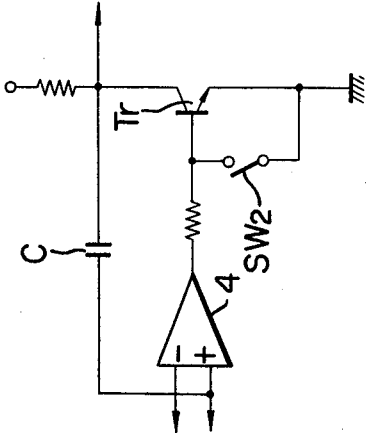
Figure 3:
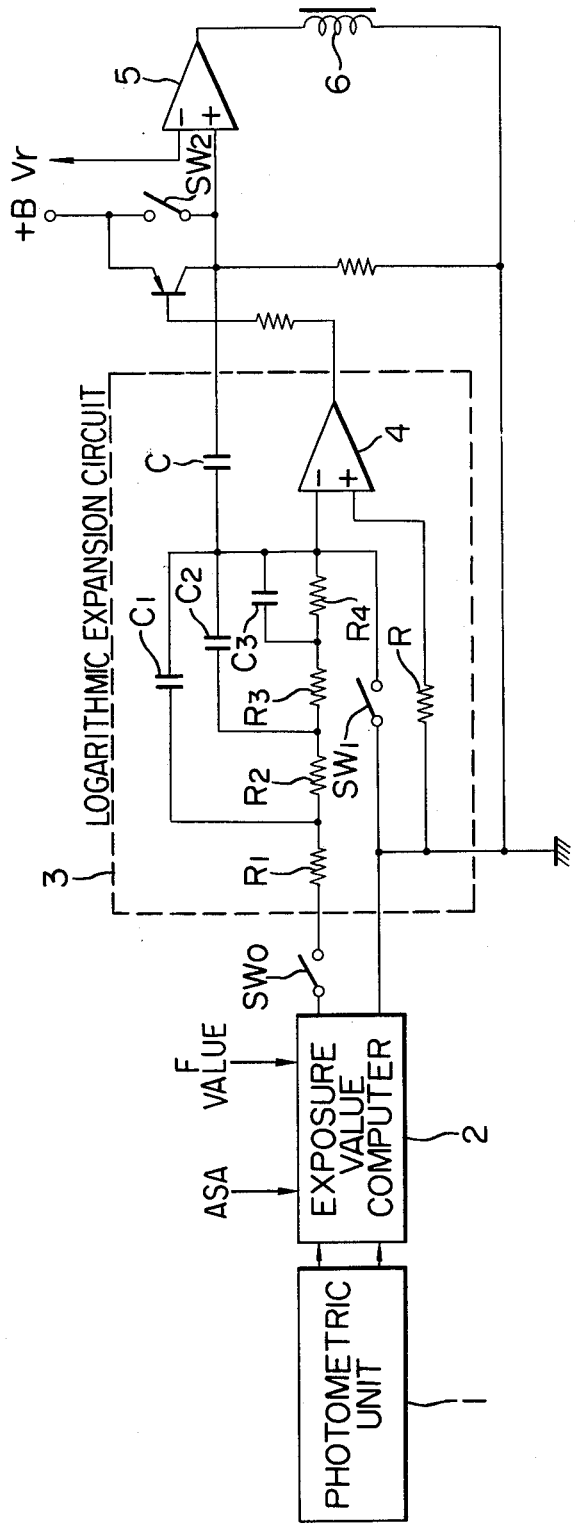

The second switch $SW_2$ connected between the output terminal of the operational amplifier 4 and the power source +B tends to cause the breakdown of the amplifier 4 and increases the current consumption. In order to overcome these problems, it is preferable to use a semiconductor element as shown in FIGS. 3-5. Alternatively, as shown in FIG. 6, the second switch $SW_2$ may be connected between the noninverting input terminal of the operational amplifier 4 and the power source +B. In FIG. 5, the second switch $SW_2$ is connected between the output terminal of the operational amplifier 4 through a resistor and ground, the ground potential being the reference voltage $V_r$.

Referring back to FIG. 1, one end of the first switch $SW_1$ is grounded, the ground potential being a reference voltage. Instead of the ground potential, any other suitable voltage source may be selected as a reference voltage. In this case, the output characteristic of the logarithmic expansion circuit 3 is dependent upon the difference between the ground potential and a selected reference voltage. It is not necessary to connect one end of the second switch $SW_2$ to the power source +B. It may be connected to any other suitable voltage source. The output characteristic of the logarithmic expansion circuit 3 is also dependent upon the difference between the reference voltage $V_r$ and the source voltage connected to one end of the second switch $SW_2$. The switches $SW_0$, $SW_1$ and $SW_2$ may be mechanical switches or electronic switches which are actuated in the manner described above upon actuation of the shutter release.

According to the present invention, no semiconductor element such as a transistor or a field-effect transistor is inserted into the portion of the logarithmic expansion circuit 3 which determines its logarithmic characteristics so that the output characteristic of the circuit 3 may be well stabilized against the temperature variation. Furthermore the reference voltage impressed on the output terminal or the noninverting input terminal of the operational amplifier 4 is substantially equal to the ground potential and the noninverting input terminal of the operational amplifier 4 is grounded prior to the shutter release so that the voltage across the integrating capacitor C is substantially equal to the source voltage +B. As a result, the voltage impressed on the inverting input terminal of the operational amplifier 4 may be varied widely within the supply voltage to the amplifier 4 so that the shutter speed or exposure time may be controlled with a higher degree of accuracy.

Still referring to FIG. 1, at the instant when the shutter actuating switch $SW_0$ is closed, the output voltage from the exposure value computer 2 is almost impressed across the resistor $R_1$ with no voltage across the resistors $R_2$-$R_4$ so that a relatively high current flows through the shutter actuating switch $SW_0$. The resultant effect is almost negligible in case of an exposure of a subject of less than higher brightness. However, in case of a subject having higher brightness (so that a higher shutter speed is required), a high current flows through the switch $SW_0$. Therefore unless the output impedance of the exposure value computer 2 is not low, the output voltage will not rise to a predetermined level so that the shutter speed becomes longer than an optimum value. When an electronic shutter or especially one utilizing a FET is used as the switch $SW_0$ instead of a mechanical shutter, the voltage drop across it due to the flow of high current causes an erratic shutter speed. When an electronic switch utilizing a transistor, the voltage drop across it presents no problem, but the base current is considerably increased. Thus a satisfactorily high speed shutter cannot be provided by merely replacing a mechanical switch with a conventional electronic switch.

Figure 7:
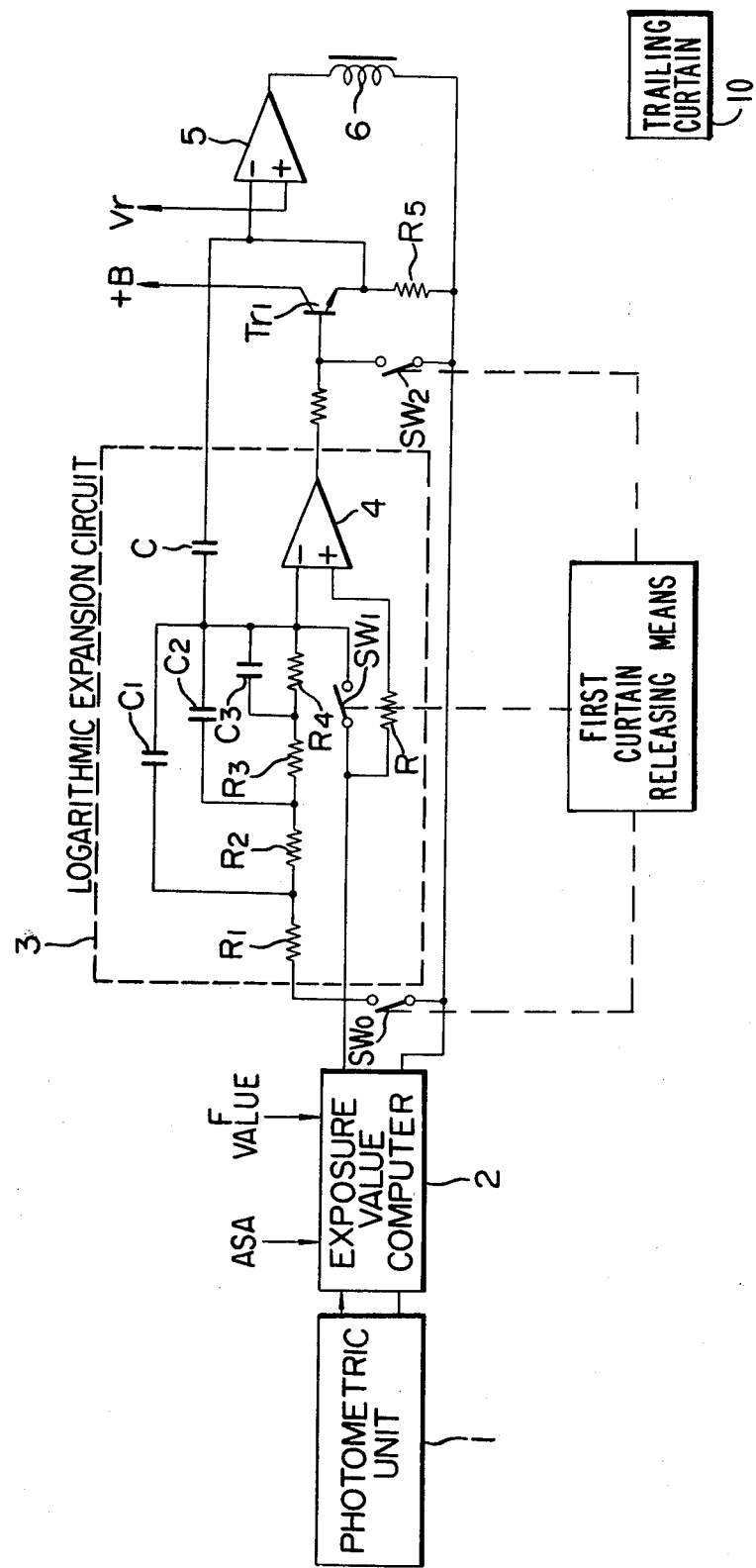
Figure 8:
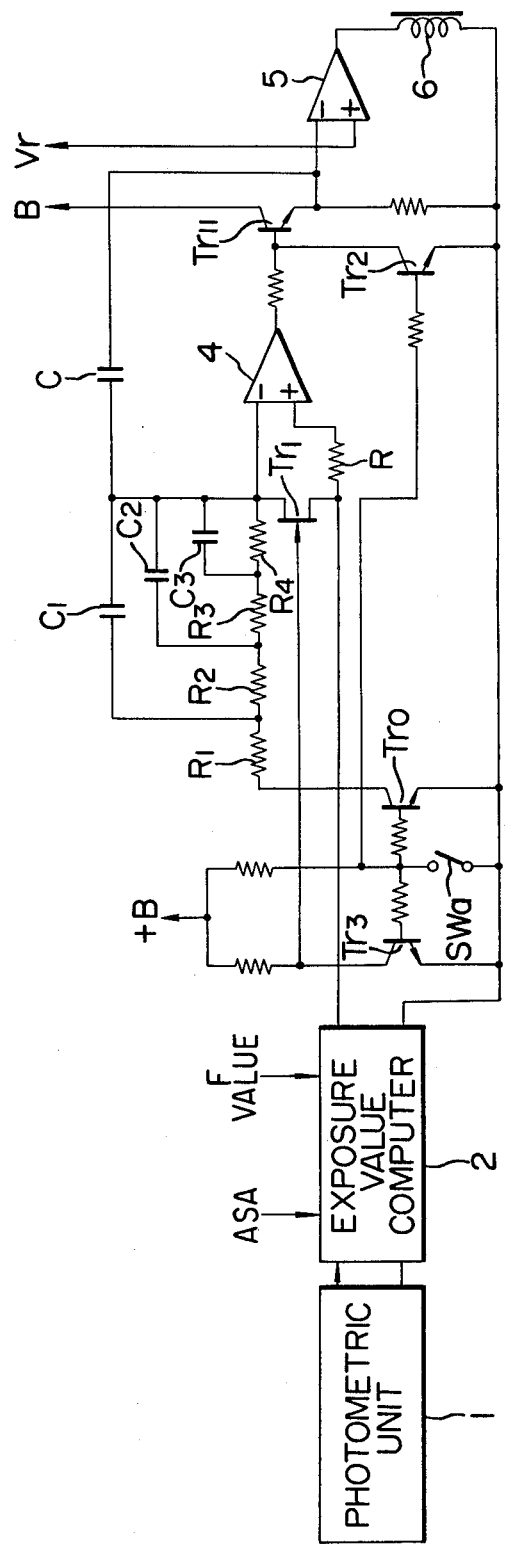
FIG. 8 is a circuit diagram of a modification of the embodiment shown in FIG. 7, wherein instead of mechanical switches electronic switches are used.

The above problems may be overcomed by the circuits shown in FIGS. 7 and 8. In the circuit shown in FIG. 7, the switches $SW_0$, $SW_1$ and $SW_2$ are mechanical switches, but in the circuit shown in FIG. 8, they are electronic switches.

While the output voltage from the exposure value computer 2 is applied to the inverting input terminal of the operational amplifier 4 in the circuit shown in FIG. 1 or FIG. 3, it is applied to the noninverting input terminal (+) in the circuit shown in FIG. 7. The output terminal of the operational amplifier 3 is connected through a resistor to the base of a transistor $Tr_{11}$. The integrating capacitor C is connected between the emitter of the transistor $Tr_{11}$ and the inverting input terminal (−) of the operational amplifier 4. The emitter is grounded through a resistor $R_5$ and the collector is connected to the voltage source +B. The second switch $SW_2$ is connected between the base and ground. When the switch $SW_0$ is opened while the switches $SW_1$ and $SW_2$ are closed, the capacitor C is charged to a voltage substantially equal to the output voltage from the exposure value computer 2. The output from the comparator 5 energizes the electromagnet 6 so as to hold the second curtain. When the shutter release is actuated, the switch $SW_0$ is closed while the switches $SW_1$ and $SW_2$ are opened and the first curtain is drawn. The operational amplifier 4 and the integrating capacitor C start integration. When the output voltage from the logarithmic expansion circuit 3 exceeds the reference voltage $V_r$ applied to the comparator 5, no output is derived from the comparator 5 so that the electromagnet 6 is de-energized, releasing the second curtain, whereby an optimum exposure time or shutter speed may be obtained.

Since the output voltage from the exposure value computer 2 is impressed on the noninverting input terminal of the operational amplifier 4, the reference voltage $V_r$ is applied to the (+) input terminal and the integrating capacitor C is connected to the (−) input terminal of the operational amplifier 4. Therefore while the output voltage from the expansion circuit 3 shown in FIG. 1 or 3 gradually decreases after the first curtain was drawn, the output voltage from the expansion circuit 3 shown in FIG. 7 gradually increases.

When the switches $SW_0$, $SW_1$ and $SW_2$ are mechanical switches, it becomes difficult to attain complete synchronization of the switch $SW_0$, and the first and second switches $SW_1$, $SW_2$ at a high shutter speed. This problem may be overcome by use of electronic switches as will be described with reference to FIG. 8.

Referring to FIG. 8, a transistor $Tr_0$ is used instead of the shutter actuation switch $SW_0$; an N-channel field-effect transistor $Tr_1$, as the first switch $SW_1$; and a transistor $Tr_2$, as the second switch $SW_2$. In order to simultaneously control these electronic switches, a transistor $Tr_3$ and a switch $SW_a$ are used. That is, when the switch $SW_a$ is opened so as to drive a first-curtain-start signal, the actuations of the switches $SW_0$, $SW_1$ and $Sw_2$ may be precisely synchronized. Furthermore, because of the use of electronic switches, mechanical contacts may be reduced in number. In addition, chattering of the switch $SW_a$ will not cause any adverse effects. Thus the circuit shown in FIG. 8 is more reliable and dependable in operation.

Instead of the N-channel field-effect transistor $Tr_1$, a P-channel field-effect transistor may be used which is controlled by a high voltage from the switch $SW_a$. In this case, the cutoff voltage must be taken into consideration. When the exposure value computer 2 has a relatively low output impedance, a bipolar transistor may be used.

In the embodiments shown in FIGS. 7 and 8, when the shutter actuation switch $SW_0$ is closed, the output voltage from the exposure value computer 2 is impressed only at the noninverting input terminal of the operational amplifier 4. Therefore it is not needed to decrease the output impedance of the exposure value computer 2 in order to attain a high shutter speed. Thus the design of the exposure value computer 2 may be simplified. In addition, a transistor may be used as the shutter actuation switch through which flows a high current. The saturation voltage is low when the transistor is enabled and the voltage at the output terminal of the transistor is set to the ground potential so that no limit is imposed on the control input on the base electrode. Thus precise high speed shutter operation may be ensured.

What is claimed is:

1. An electronic shutter driving device comprising a photometric unit for measuring brightness of a subject and generating an output signal which is a logarithmic compression of said brightness, an exposure value computer responsive to the output signal from said photometric unit, a logarithmic expansion circuit having an input terminal coupled to the output of said exposure value computer, a comparator having positive and negative input terminals for comparing the output from said logarithmic expansion circuit with a reference voltage, a first curtain releasing means, and an electromagnet coupled to the output of said comparator which is energized to hold a second curtain and de-energized to release said second curtain a predetermined time interval after said first curtain was released, characterized in that
   (a) said logarithmic expansion circuit (3) comprises an operation amplifier (4),
   a series of resistors ($R_1$, $R_2$, $R_3$ and $R_4$) interconnected between an output terminal of said exposure value computer and an inverting input terminal (−) of said operational amplifier (4) through an input terminal of said logarithmic expansion circuit,
   a plurality of capacitors ($C_1$, $C_2$ and $C_3$) interconnected between said inverting input terminal of said operational amplifier (4) and the junctions, respectively, between said series of resistors, an integrating capacitor (C) interconnected between the output terminal of said operational amplifier (4) and said inverting input terminal (−) thereof, a first switch interconnected between said inverting input terminal (−) of said operational amplifier (4) and a source of reference potential, and a resistor (R) interconnected between a noninverting input terminal (+) of said operational amplifier (4) and said reference potential;
   (b) a shutter actuation switching means ($SW_0$) interconnected in series with said series of resistors between said input terminal of said logarithmic expansion circuit (3) and said output terminal of said exposure value computer;
   (c) a second switch ($SW_2$) interconnected between a voltage source (+B) and the noninverting input terminal of said comparator (5);
   (d) the output terminal of said logarithmic expansion circuit (3) being connected to the noninverting input terminal of said comparator (5), means for applying a reference voltage to the inverting input terminal of said comparator (5);
   (e) such that prior to the actuation of a shutter release, said shutter actuation switch ($SW_0$) remains opened while said first and second switches ($SW_1$ and $SW_2$) remain closed, but when said shutter release is actuated, said shutter actuation shutter ($SW_0$) is closed while said first and second switches ($SW_1$ and $SW_2$) are opened so that said logarithmic expansion circuit (3) starts integration so as to determine an optimum shutter speed, said electromagnet being de-energized to release the second curtain when the output voltage from said logarithmic expansion circuit (3) traverses the level of said reference voltage ($V_r$).

2. An electronic shutter driving device as set forth in claim 1 characterized in that
   said second switch ($SW_2$) consists of an electronic switch.

3. An electronic shutter driving device comprising a photometric unit for measuring brightness of a subject and generating an output signal which is a logarithmic compression of said brightness, an exposure value computer responsive to the output signal from said photometric unit, a logarithmic expansion circuit having an input terminal coupled to the output of said exposure value computer, a comparator having positive and negative input terminals for comparing the output from said logarithmic expansion circuit with a reference voltage, a first curtain releasing means, and an electromagnet coupled to the output of said comparator which is energized to hold a second curtain and de-energized to release said second curtain a predetermined time interval after said first curtain was released, characterized in that
   (a) said logarithmic expansion circuit (3) comprises an operational amplifier (4),
   a series of resistors ($R_1$, $R_2$, $R_3$ and $R_4$) interconnected between a reference terminal of said exposure value computer and an inverting input terminal (−) of said operational amplifier (4) through an input terminal of said logarithmic expansion circuit,
   a plurality of capacitors ($C_1$, $C_2$ and $C_3$) interconnected between said inverting input terminal of said operational amplifier (4) and the junctions, respectively, between said series of resistors, an integrating capacitor (C) interconnected between the output terminal of said operational amplifier (4) and said inverting input terminal (−) thereof, a first switch interconnected between said inverting input terminal (−) of said operational amplifier (4) and an output terminal of said exposure value computer, and a resistor (R) interconnected between a noninverting input terminal (+) of said operational amplifier (4) and said exposure value computer output terminal;

(b) a shutter actuation switching means (SW$_0$) interconnected between said input terminal of said logarithmic expansion circuit (3) and said reference terminal of said exposure value computer;

(c) a second switch (SW$_2$) interconnected between said reference terminal and the output terminal of said operational amplifier (4);

(d) the output terminal of said logarithmic expansion circuit (3) being coupled to an inverting input terminal of said comparator (5), means for applying a reference voltage to a noninverting input terminal of said comparator (5), (e) such that prior to the actuation of a shutter release, said shutter actuation switch (SW$_0$) remains opened while said first and second switches (SW$_1$ and SW$_2$) remain closed, but when said shutter release is actuated, said shutter actuation shutter (SW$_0$) is closed while said first and second switches (SW$_1$ and SW$_2$) are opened so that said logarithmic expansion circuit (3) starts integration so as to determine an optimum shutter speed, said electromagnet being de-energized to release the second curtain when the output voltage from said logarithmic expansion circuit (3) traverses the level of said reference voltage (V$_r$).

4. An electronic shutter driving device as set forth in claim 3 characterized in that said shutter actuation switch (SW$_0$) and said first and second switches (SW$_1$ and SW$_2$) are electronic switches the actuations of which are synchronized.

* * * * *